(12) United States Patent
Zupanc et al.

(10) Patent No.: US 8,127,554 B2
(45) Date of Patent: Mar. 6, 2012

(54) QUENCH JET ARRANGEMENT FOR ANNULAR RICH-QUENCH-LEAN GAS TURBINE COMBUSTORS

(75) Inventors: Frank J. Zupanc, Phoenix, AZ (US); Rodolphe Dudebout, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 1132 days.

(21) Appl. No.: 11/947,337

(22) Filed: Nov. 29, 2007

(65) Prior Publication Data

US 2009/0139239 A1    Jun. 4, 2009

(51) Int. Cl.
F02C 1/00 (2006.01)
F02G 3/00 (2006.01)

(52) U.S. Cl. .......................................................... 60/754
(58) Field of Classification Search ............. 60/752, 60/754–760
See application file for complete search history.

(56) References Cited

U.S. PATENT DOCUMENTS

| | | |
|---|---|---|
| 4,698,963 A | 10/1987 | Taylor |
| 4,893,475 A | 1/1990 | Willis |
| 5,819,540 A | 10/1998 | Massarani |
| 5,996,351 A | 12/1999 | Feitelberg |
| 6,070,412 A | 6/2000 | Ansart et al. |
| 6,101,814 A | 8/2000 | Hoke et al. |
| 6,240,731 B1 | 6/2001 | Hoke et al. |
| 6,286,298 B1 | 9/2001 | Burrus et al. |
| 6,378,286 B2 | 4/2002 | Vermes et al. |
| 6,474,070 B1 | 11/2002 | Danis et al. |
| 6,810,673 B2 | 11/2004 | Snyder |
| 6,826,913 B2 | 12/2004 | Wright |
| 7,000,400 B2 | 2/2006 | Schumacher et al. |
| 7,065,972 B2 | 6/2006 | Zupanc et al. |
| 7,185,497 B2 | 3/2007 | Dudebout et al. |
| 7,748,222 B2 * | 7/2010 | Bernier et al. .................. 60/754 |
| 2002/0116929 A1 | 8/2002 | Snyder |
| 2007/0125093 A1 | 6/2007 | Burd et al. |
| 2008/0083224 A1 | 4/2008 | Varatharajan et al. |
| 2008/0127651 A1 | 6/2008 | Zupanc et al. |
| 2009/0139239 A1 | 6/2009 | Zupanc et al. |
| 2009/0218821 A1 | 9/2009 | Elkady et al. |

* cited by examiner

*Primary Examiner* — Ehud Gartenberg
*Assistant Examiner* — Andrew Nguyen
(74) *Attorney, Agent, or Firm* — Ingrassia Fisher & Lorenz, P.C.

(57) ABSTRACT

An outer liner of a combustor of a gas turbine engine includes a plurality of liner regions arranged adjacent one another and separated by boundary lines; and a plurality of air admission holes formed in the liner regions. The air admission holes within each liner region form a V-pattern.

16 Claims, 3 Drawing Sheets

QUENCH JET ARRANGEMENT FOR ANNULAR RICH-QUENCH-LEAN GAS TURBINE COMBUSTORS

TECHNICAL FIELD

The present invention generally relates to gas turbine engine combustors, and more particularly, to a quench jet arrangement for reducing NOx emissions from annular rich burn, quick-quench, lean burn (RQL) gas turbine engine combustors.

BACKGROUND

Gas turbine engines, such as those used to power modern commercial aircraft, typically include a compressor for pressurizing a supply of air, a combustor for burning a fuel in the presence of the pressurized air, and a turbine for extracting energy from the resultant combustion gases. The combustor typically includes radially spaced apart inner and outer liners. The inner and outer liners define an annular combustion chamber between the compressor and the turbine. A number of circumferentially distributed fuel injectors project into the forward end of the combustion chamber to supply the fuel to the combustion chamber. Rows of circumferentially distributed air admission holes penetrate each liner to admit air into the combustion chamber.

There is an increasing emphasis on the reduction of gaseous pollutant emissions that form in the combustion process of gas turbine engines, particularly oxides of nitrogen (NOx). One approach to reduce NOx emissions is the implementation of a rich burn, quick quench, lean burn (RQL) combustion concept. A combustor configured for RQL combustion includes the following three serially arranged combustion zones: a rich burn zone at the forward end of the combustor, a quick quench or dilution zone downstream of the rich burn zone, and a lean burn zone downstream of the quench zone. By precisely controlling the zone stoichiometries between the air and fuel, high-temperature excursions can be reduced and the resulting NOx emissions can be minimized. The effectiveness of the RQL concept, however, is primarily dependent on the design of the quick quench section of the combustor where the fuel-rich gases from the rich burn zone are rapidly mixed with excess air and passed to the lean burn zone. The design and development of the quench zone geometry is one of the challenges in the successful implementation of low-emissions RQL combustors.

Accordingly, it is desirable to provide a combustor with improved NOx emissions. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with one exemplary embodiment, a combustor for a turbine engine includes an outer liner having a first group of air admission holes and defining a plurality of outer liner regions. Each outer liner region is separated from an adjacent outer liner by an outer boundary line. The engine further includes an inner liner circumscribed by the outer liner and forming a combustion chamber therebetween. The inner liner has a second group of air admission holes and defines a plurality of inner liner regions, with each inner liner region being separated from an adjacent inner liner region by an inner boundary line. The engine further includes a plurality of fuel injectors extending into the combustion chamber and configured to deliver an air-fuel mixture to the combustion chamber. Each of the plurality of fuel injectors is associated with one of the outer liner regions and one of the inner liner regions, with the first group of air admission holes within a respective outer liner region including a first air admission hole axially aligned with the respective fuel injector and a second air admission hole approximately on the outer boundary line between the respective outer liner region and a first adjacent outer liner region. The first air admission hole is downstream of the second air admission hole.

In accordance with another exemplary embodiment, an outer liner of a combustor of a gas turbine engine includes a plurality of liner regions arranged adjacent one another and separated by boundary lines; and a plurality of air admission holes formed in the liner regions. The air admission holes within each liner region form a V-pattern.

In accordance with yet another exemplary embodiment, a combustor for a turbine engine includes an outer liner having a first group of air admission holes and defining a plurality of outer liner regions, with each outer liner region being separated from an adjacent outer liner by an outer boundary line. The combustor further includes an inner liner circumscribed by the outer liner and forming a combustion chamber therebetween, the inner liner having a second group of air admission holes and defining a plurality of inner liner regions, with each inner liner region being separated from an adjacent inner liner region by an inner boundary line. The combustor further includes a plurality of fuel injectors extending into the combustion chamber and configured to deliver an air-fuel mixture to the combustion chamber, with each of the plurality of fuel injectors being associated with one of the outer liner regions and one of the inner liner regions. The first group of air admission holes within a respective outer liner region includes a first air admission hole axially aligned with the respective fuel injector, a second air admission hole approximately on the outer boundary line between the respective outer liner region and a first adjacent outer liner region, the first air admission hole being downstream of the second air admission hole; a third air admission hole approximately on the outer boundary line between the respective outer liner region and a second adjacent outer liner region, the third air admission hole being circumferentially aligned with the second air admission hole; fourth and fifth air admission holes on a line between the first and second air admission holes; and sixth and seventh air admission holes on a line between the second and third air admission holes.

BRIEF DESCRIPTION OF THE DRAWINGS

The present invention will hereinafter be described in conjunction with the following drawing figures, wherein like numerals denote like elements.

DETAILED DESCRIPTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Exemplary embodiments described herein provide a rich-quench-lean gas turbine engine with a combustor that reduces NOx emissions. Particularly, the combustor can include inner and outer liners that have an V-shaped arrangement of staggered quench jets, with quench jets arranged to reduce NOx emissions at a first, upstream position between injectors and at a second, downstream position aligned with the injectors.

Figure 1:
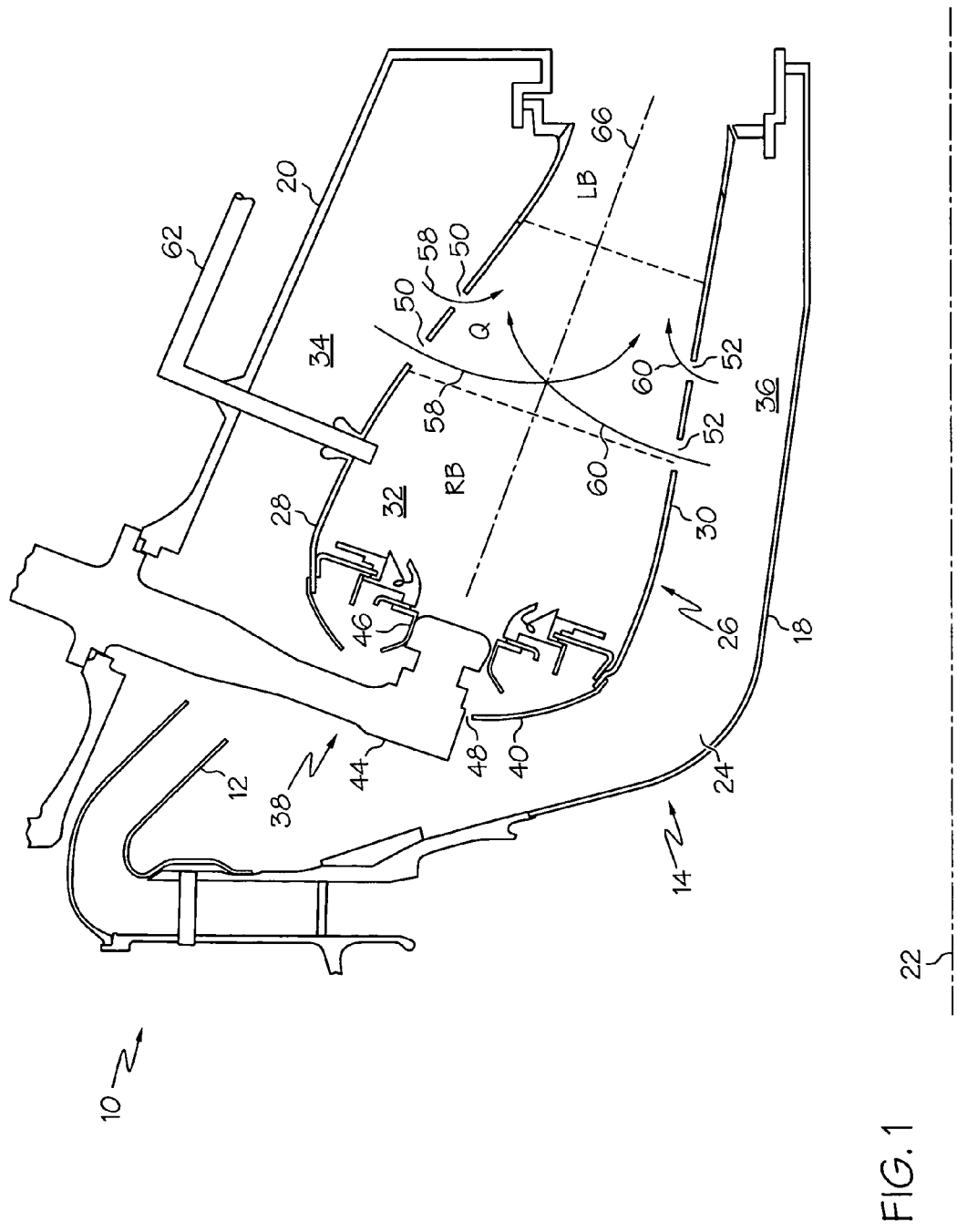
FIG. 1 is a partial, cross-sectional side elevation view of a combustor in a turbine engine according to one exemplary embodiment.

Referring to FIG. 1, a gas turbine engine 10 includes a compressor (not shown), a diffuser 12, a combustor module 14, and a turbine module (not shown). The combustor module 14 has a radially inner case 18 and a radially outer case 20 concentrically arranged with respect to the inner case 18. The inner and outer cases 18, 20 circumscribe an axially extending engine centerline 22 to define an annular pressure vessel 24. The combustor module 14 also includes a combustor 26 residing within the annular pressure vessel 24. The combustor 26 is defined by an outer liner 28 circumscribing an inner liner 30 to define an annular combustion chamber 32. The liners 28, 30 cooperate with cases 18, 20 to define respective outer and inner air plenums 34, 36.

The combustor 26 includes a front end assembly 38 having an annularly extending shroud 40, fuel injectors 44, and fuel injector guides 46. One fuel injector 44 and one fuel injector guide 46 are shown in the partial cross-sectional view of FIG. 1. In one embodiment, the combustor 26 includes a total of sixteen circumferentially distributed fuel injectors 44, but the combustor 26 can be implemented with more or fewer than this number of injectors 44.

The shroud 40 extends between and is secured to the forwardmost ends of the outer and inner liners 28, 30. A plurality of circumferentially distributed shroud ports 48 accommodate the fuel injectors 44 and introduce air into the forward end of the combustion chamber 32. Each fuel injector 44 is secured to the outer case 20 and projects through one of the shroud ports 48, and each fuel injector 44 introduces a swirling, intimately blended fuel-air mixture that supports combustion in the combustion chamber 32.

The depicted combustor 26 is a rich burn, quick quench, lean burn (RQL) combustor. During operation, a portion of the pressurized air enters a rich burn zone RB of the combustion chamber 32 by way of passages in the front end assembly 38. This air is referred to as primary combustion air because it intermixes with a stoichiometrically excessive quantity of fuel introduced through the fuel injectors 44 to support initial combustion in the rich burn zone RB. The rich stoichiometry of the fuel-air mixture in the rich burn zone RB produces a relatively cool, oxygen-deprived flame, thus preventing excessive NOx formation and guarding against blowout of the combustion flame during any abrupt reduction in engine power.

The combustion products from the rich burn zone RB, which include unburned fuel, then enter a quench zone Q. Jets 58, 60 flow from the plenums 34, 36 and into the quench zone Q through the groups 50, 52 of air admission holes in the outer and inner liners 28, 30, respectively. The groups 50, 52 of air admission holes in the outer and inner liners 28, 30 are discussed in further detail below with reference to FIGS. 2-4.

The jets 58, 60 are referred to as quench air because they rapidly mix the combustion products from their stoichiometrically rich state at the forward edge of the quench zone Q to a stoichiometrically lean state at, or just downstream of, the aft edge of the quench zone Q. The quench air rapidly mixes with the combustion products entering the quench zone Q to support further combustion and release additional energy from the fuel. Since thermal NOx formation is a strong time-at-temperature phenomenon, it is important that the fuel-rich mixture passing through the quench zone be mixed rapidly and thoroughly to a fuel-lean state in order to avoid excessive NOx generation. Thus the design of the quench air jet arrangement in an RQL combustor is important to the successful reduction of NOx levels.

Finally, the combustion products from the quench zone Q enter a lean burn zone LB where the combustion process concludes. As the combustion products flow into the lean burn zone LB, the air jets 58, 60 are swept downstream and also continue to penetrate radially and spread out laterally and intermix thoroughly with the combustion gases.

Figure 2:
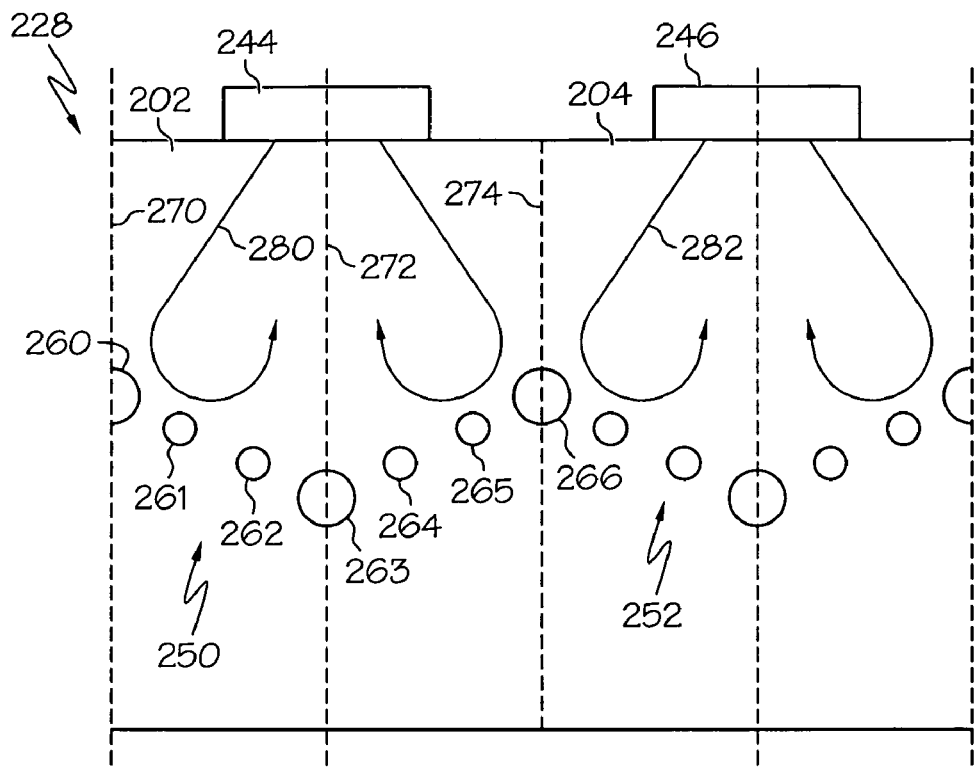
FIG. 2 is a partial, plan view of an outer liner of the combustor of FIG. 1.

FIG. 2 is a plan view of a portion of an outer liner 228 suitable for use in a combustor such as the combustor 26 of FIG. 1. Generally, the outer liner 228 can be considered a series of regions, e.g., regions 202, 204. Each region 202, 204 is associated with an injector, e.g., injector 244, 246. Each of the regions 202, 204 has a group of air admission holes 250, 252 that admits jets into the quench zone Q of the combustor as discussed above.

As an example, region 250 includes at least portions of seven air admission holes 260-266 that form a "V" configuration to ensure that the fuel air mixture quickly becomes thoroughly blended and regularly distributed. A first air admission hole 260 is positioned on a first boundary line 270 between the region 250 and an adjacent region (not shown). Second and third air admission holes 261, 262 are adjacent to and downstream of the first air admission hole 260. The fourth air admission hole 263 is axially aligned with the injector 244, as indicated by the dashed line 272, and downstream of the third air admission hole 262. The fifth and sixth air admission holes 264, 265 are adjacent to and upstream of the fourth air admission hole 263. The seventh air admission hole 266 is positioned on a second boundary line 274 between the region 250 and the adjacent region 204 and is upstream of the sixth air admission hole 265. Generally, the first air admission hole 260 is circumferentially aligned with the seventh air admission hole 266, and the second and third air admission holes 261, 262 are respectively circumferentially aligned with the fifth and sixth air admission holes 264, 265. The first, fourth, and seventh air admission holes 260, 263, 266 are relatively larger than the second, third, fifth, and sixth air admission holes 261, 262, 264, 265. As such, the first, fourth, and seventh air admission holes 260, 263, 266 are considered "major" holes and the second, third, fifth, and sixth air admission holes 261, 262, 264, 265 are considered "minor" holes. The group 252 of air admission holes in the adjacent second region 204 are positioned in the same pattern as the group 250 of air admission holes in the first region 202 with the seventh air admission hole 266 of the first region 202 serving as the first air admission hole of the second region 204.

Swirler flowfield patterns 280, 282 are shown for each of the first and second regions 202, 204. Due to the tendency of the swirlers to form an "outside-in" recirculation zone, in some conventional engines, the regions in between adjacent swirlers may exhibit less effective mixing and correspondingly may result in excessive NOx formation upstream of the quench zone. The first and seventh air admission holes 260, 266 are particularly positioned between regions (e.g., regions 202, 204) to reduce residence times of the local combustion gases in the regions between adjacent swirlers and thereby reduce the formation of NOx. Similarly, the "outside-in" recirculation zone tends to draw air upstream into the core of the recirculation in line with each swirler. This results in a local reduction in the fuel-rich stoichiometry of the primary zone and produce additional NOx formation. Accordingly, the fourth air admission hole 263 is positioned further downstream from the central recirculation zone to mitigate the amount of quench air that gets recirculated, thereby further reducing NOx formation in the primary zone. The first and seventh air admission holes 260, 266 are generally upstream of similar air admission holes in some conventional combustors, and the fourth air admission hole 263 is generally downstream of a similar air admission hole in some conventional combustors.

Figure 3:
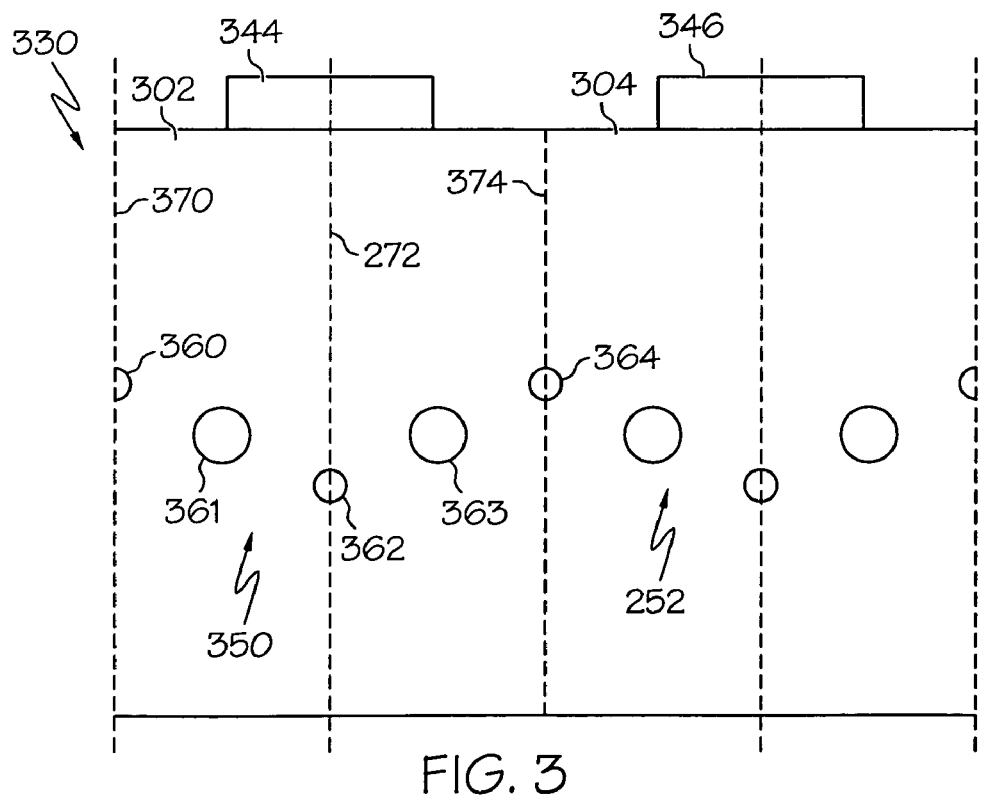
FIG. 3 is a partial, plan view of an inner liner of the combustor of FIG. 1.

FIG. 3 is a plan view of a portion of an inner liner 330 suitable for use in a combustor such as the combustor 26 of FIG. 1 and works in conjunction with an outer liner such as outer liner 228 (FIG. 2) to sure that air is properly mixed with the fuel. Generally, the inner liner 330 can be considered a series of regions, e.g., regions 302, 304. Each region 302, 304 is associated with an injector, e.g., injector 344, 346. Each of the regions 302, 304 has a group of air admission holes 350, 352 that admits jets into the quench zone of the combustor as discussed above. As will be discussed in further detail below with reference to FIG. 4, the arrangement of the air admission holes 350, 352 of the inner liner 338 in FIG. 3 generally corresponds to the air admission holes 250, 252 of the outer liner 228 of FIG. 2.

As an example, region 302 includes at least portions of five air admission holes 360-364 that form a "V" configuration on the inner liner. A first air admission hole 360 is positioned on a first boundary line 370 between the region 302 and an adjacent region (not shown). A second air admission hole 361 is adjacent to and downstream of the first air admission hole 360. The third air admission hole 362 is axially aligned with the injector 344, as indicated by the dashed line 372, and downstream of the second air admission hole 361. The fourth air admission hole 363 is adjacent to and upstream of the third air admission hole 362. The fifth air admission hole 364 is positioned on a second boundary line 374 between the region 302 and the adjacent region 304 and is upstream of the fourth air admission hole 363. Generally, the first air admission hole 360 is circumferentially aligned with the fifth air admission hole 364, and the second air admission hole 361 is circumferentially aligned with the fourth air admission hole 363. The first, third, and fifth air admission holes 360, 362, 364 are relatively smaller than the second and fourth air admission holes 361, 363. As such, the first, third, and fifth air admission holes 360, 362, 364 are considered "minor" holes and the second and fourth air admission holes 361, 363 are considered "major" holes. The group 352 of air admission holes in the adjacent second region 304 are positioned in the same pattern as the group 350 of air admission holes in the first region 302 with the fifth air admission hole 364 of the first region 302 serving as the first air admission hole of the second region 304.

Figure 4:
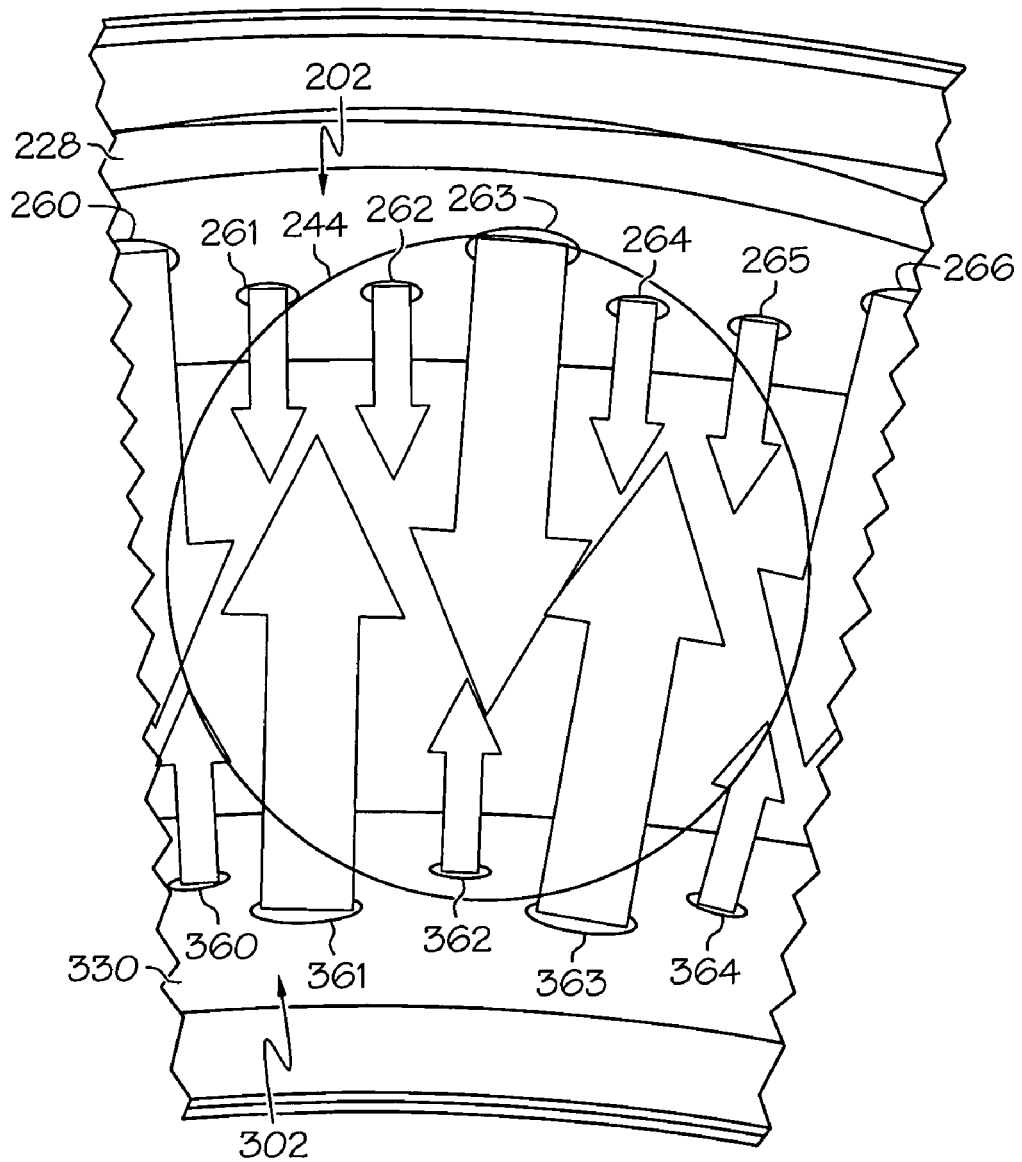
FIG. 4 is a partial, axial cross-sectional view of the combustor of FIG. 1.

FIG. 4 illustrates a partial axial cross-sectional view of the first region 202, 302 of the outer and inner liners 228, 330. As discussed above, the air admission holes 260-266 of the outer liner 228 cooperate with air admission holes 360-364 of the inner liner 330. Generally, major jets from the major holes, such as air admission hole 260 and air admission hole 361, penetrate radially inward about 75% of the width of the combustion chamber, and minor jets from the minor holes, such as air admission hole 360 and air admission holes 261, 262, penetrate radially inward about 25% of the width of the combustion chamber. In this embodiment, the major jets from the major holes, such as air admission hole 260, are paired with minor jets from the minor holes, such as air admission hole 361. In other words, the major holes in the outer and inner liners 228, 330 can be considered staggered with respect to one another, and the minor holes in the outer and inner liners 228, 330 can similarly be considered staggered. This configuration ensures that dilution air spans radially across the entire combustion chamber annulus and that the combustion gases are properly quenched, thus preventing elevated levels of NOx.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A combustor for a turbine engine, comprising: an outer liner having a first group of air admission holes and defining a plurality of outer liner regions, each outer liner region being separated from an adjacent outer liner by an outer boundary line;
    an inner liner circumscribed by the outer liner and forming a combustion chamber therebetween, the inner liner having a second group of air admission holes and defining a plurality of inner liner regions, each inner liner region being separated from an adjacent inner liner region by an inner boundary line, and wherein each of the first group of air admission holes is a combustion air admission hole configured to admit a quench jet into the combustion chamber such that the quench jet penetrates radially inward at least 25% of a width of the combustion chamber;
    a plurality of fuel injectors extending into the combustion chamber and configured to deliver an air-fuel mixture to the combustion chamber, each of the plurality of fuel injectors being associated with one of the outer liner regions and one of the inner liner regions, wherein the first group of air admission holes within a respective outer liner region includes a first air admission hole axially aligned with the respective fuel injector and a second air admission hole approximately on the outer boundary line between the respective outer liner region and a first adjacent outer liner region, the first air admission hole being downstream of the second air admission hole;
    wherein the first group of air admission holes includes a third air admission hole approximately on the outer boundary line between the respective outer liner region and a second adjacent outer liner region; and
    wherein the first group of air admission holes includes fourth and fifth air admission holes on a line between the first and second air admission holes and sixth and seventh air admission holes on a line between the first and third air admission holes.

2. The combustor of claim 1, wherein the first, second and third air admission holes are larger than the fourth, fifth, sixth and seventh air admission holes.

3. The combustor of claim 1, wherein the first group of air admission holes has a pattern that is repeated in additional groups of air admission holes in the adjacent outer regions.

4. The combustor of claim 1, wherein the combustion chamber defines a rich burn zone, a quench zone, and a lean burn zone, the first group of air admission holes introducing the air jets into the quench zone.

5. The combustor of claim 1, wherein the second group of air admission holes within a respective inner liner region includes a first air admission hole axially aligned with the respective fuel injector and a second air admission hole approximately on the inner boundary line between the respective inner liner region and a first adjacent inner liner region, the first air admission hole being downstream of the second air admission hole.

6. The combustor of claim 5, wherein the first air admission hole of the second group is generally aligned with the first air admission hole of the first group.

7. The combustor of claim 1, wherein the first group of air admission holes is generally aligned with the second group of air admission holes.

8. The combustor of claim 1, wherein the second group of air admission holes has a pattern that is repeated in additional groups of air admission holes in the adjacent outer regions.

9. The combustor of claim 5, wherein the second group of air admission holes includes a third air admission hole approximately on the inner boundary line between the respective inner liner region and a second adjacent inner liner region.

10. The combustor of claim 9, wherein the second group of air admission holes within the respective inner liner region includes
    a fourth air admission hole of the second group that is downstream of the second air admission hole of the second group, upstream of the first air admission hole of the second group, and circumferentially between the first and second air admission holes of the second group; and
    a fifth air admission hole of the second group that is downstream of the third air admission hole of the second group, upstream of the first air admission hole of the second group, and circumferentially between the first and third air admission holes of the second group.

11. The combustor of claim 10, wherein first and second groups each include a plurality of large air admission holes, the large air admission holes of the first and second groups being circumferentially staggered with respect to each other.

12. The combustor of claim 5, wherein the combustor chamber defines a width and wherein the first air admission hole of the first group admits a first air jet that penetrates about 75% of the width of the combustor chamber and the first air admission hole of the second group admits a second air jet that penetrates about 25% of the width of the combustion chamber.

13. An outer liner of a combustor of a gas turbine engine, comprising:
    a plurality of liner regions arranged adjacent one another and separated by boundary lines;
    a plurality of combustion air admission holes formed in the liner regions, the air admission holes within each liner region forming a V-pattern of at least seven combustion air admission holes, wherein the plurality of air admission holes includes a first air admission hole axially aligned with a respective fuel injector and a second air admission hole approximately on a first boundary line between a respective liner region and a first adjacent outer liner region, the first air admission hole being downstream of the second air admission hole;
    a third air admission hole approximately on a second boundary line between the respective outer liner region and a second adjacent outer liner region;
    wherein the plurality of air admission holes includes fourth and fifth air admission holes on a line between the first and second air admission holes and sixth and seventh air admission holes on a line between the first and third air admission holes; and
    wherein each of the air admission holes is a combustion air admission hole configured to admit a quench jet into the combustion chamber such that the quench jet penetrates radially inward at least 25% of a width of the combustion chamber.

14. A combustor for a turbine engine, comprising: an outer liner having a first group of air admission holes and defining a plurality of outer liner regions, each outer liner region being separated from an adjacent outer liner by an outer boundary line;
    an inner liner circumscribed by the outer liner and forming a combustion chamber therebetween, the inner liner having a second group of air admission holes and defining a plurality of inner liner regions, each inner liner region being separated from an adjacent inner liner region by an inner boundary line;
    a plurality of fuel injectors extending into the combustion chamber and configured to deliver an air-fuel mixture to the combustion chamber, each of the plurality of fuel injectors being associated with one of the outer liner regions and one of the inner liner regions, and wherein each of the first group of air admission holes is a combustion air admission hole configured to admit a major or minor jet into the combustion chamber such that each major or minor jet penetrates radially inward at least 25% of a width of the combustion chamber,
    wherein the first group of air admission holes within a respective outer liner region includes a first air admission hole axially aligned with the respective fuel injector, a second air admission hole approximately on the outer boundary line between the respective outer liner region and a first adjacent outer liner region, the first air admission hole being downstream of the second air admission hole;
    a third air admission hole approximately on the outer boundary line between the respective outer liner region and a second adjacent outer liner region, the third air admission hole being circumferentially aligned with the second air admission hole;
    fourth and fifth air admission holes on a line between the first and second air admission holes; and
    sixth and seventh air admission holes on a line between the first and third air admission holes.

15. The combustor of claim 14, wherein the second group of air admission holes within a respective inner liner region includes
    a first air admission hole axially aligned with the respective fuel injector,
    a second air admission hole approximately on the inner boundary line between the respective inner liner region and a first adjacent inner liner region, the first air admission hole being downstream of the second air admission hole,
    a third air admission hole approximately on the inner boundary between the respective inner liner region and a second adjacent inner liner region,
    a fourth air admission hole that is downstream of the second air admission hole, upstream of the first air admission hole, and circumferentially between the first and second air admission holes; and a fifth air admission hole that is downstream of the third air admission hole, upstream of the first air admission hole, and circumferentially between the first and third air admission holes.

16. The combustor of claim 1, wherein the each of the second group of air admission holes is configured to admit the quench jet into the combustion chamber such that the quench jet penetrates radially inward at least 25% of a width of the combustion chamber.

* * * * *